(12) United States Patent
Noy et al.

(10) Patent No.: US 8,000,235 B2
(45) Date of Patent: Aug. 16, 2011

(54) BANDWIDTH ALLOCATION METHOD AND APPARATUS

(75) Inventors: Ariel Noy, Herzlia (IL); Gideon Kaempfer, RaAnana (IL)

(73) Assignee: ConteXtream Ltd., Petach-Tikva (IL)

( * ) Notice: Subject to any disclaimer, the term of this patent is extended or adjusted under 35 U.S.C. 154(b) by 46 days.

(21) Appl. No.: 12/409,562

(22) Filed: Mar. 24, 2009

(65) Prior Publication Data

US 2010/0085874 A1   Apr. 8, 2010

Related U.S. Application Data

(60) Provisional application No. 61/102,847, filed on Oct. 5, 2008.

(51) Int. Cl.
*G01R 31/08* (2006.01)
(52) U.S. Cl. ........................................ 370/230; 370/235
(58) Field of Classification Search .................. 370/230, 370/235, 235.1, 236
See application file for complete search history.

(56) References Cited

U.S. PATENT DOCUMENTS

| | | | | |
|---|---|---|---|---|
| 6,366,761 B1 * | 4/2002 | Montpetit | | 455/12.1 |
| 6,622,172 B1 * | 9/2003 | Tam | | 709/232 |
| 2004/0151184 A1 * | 8/2004 | Wang et al. | | 370/395.2 |
| 2005/0041584 A1 * | 2/2005 | Lau et al. | | 370/235 |
| 2005/0175014 A1 * | 8/2005 | Patrick | | 370/395.43 |
| 2007/0058548 A1 * | 3/2007 | Babonneau et al. | | 370/235.1 |
| 2007/0153697 A1 | 7/2007 | Kwan et al. | | |
| 2008/0159135 A1 | 7/2008 | Caram | | |
| 2008/0192636 A1 * | 8/2008 | Briscoe et al. | | 370/236 |

FOREIGN PATENT DOCUMENTS

WO   WO 2007/113517   10/2007
WO   WO 2010/038226   4/2010

OTHER PUBLICATIONS

International Search Report and the Written Opinion Dated Jan. 7, 2010 From the International Searching Authority Re.: Application No. PCT/IL2009/000811.
Hellberg et al. "Broadband Network Architecture: Designing and Deploying Triple Play Services", Pearson Education, XP002561303, 2007, p. 289-361.
International Preliminary Report on Patentability Dated Apr. 14, 2011 From the International Bureau of WIPO Re. Application No. PCT/IL2009/000811.

* cited by examiner

*Primary Examiner* — Ricky Ngo
*Assistant Examiner* — David Oveissi

(57) ABSTRACT

System for bandwidth assignment to manage congestion over a network bottleneck, comprises a regulation point being set up downstream of the bottleneck in the network to manage congestion in data packets arriving from various sources via the bottleneck. For each of the sources, a priority level assigner assigns priority levels to respective data packets. A token bucket assigns tokens at a limiting rate to the prioritized data packets, the tokens allowing passage of packets to which they are assigned. The token bucket is a multi-priority token bucket, meaning it has at least two thresholds corresponding to the priority levels assigned to the packets. The token bucket only assigns a token to an arriving packet having a respective priority level if there are sufficient tokens currently in the bucket to reach the threshold corresponding to the packet's priority level.

12 Claims, 6 Drawing Sheets

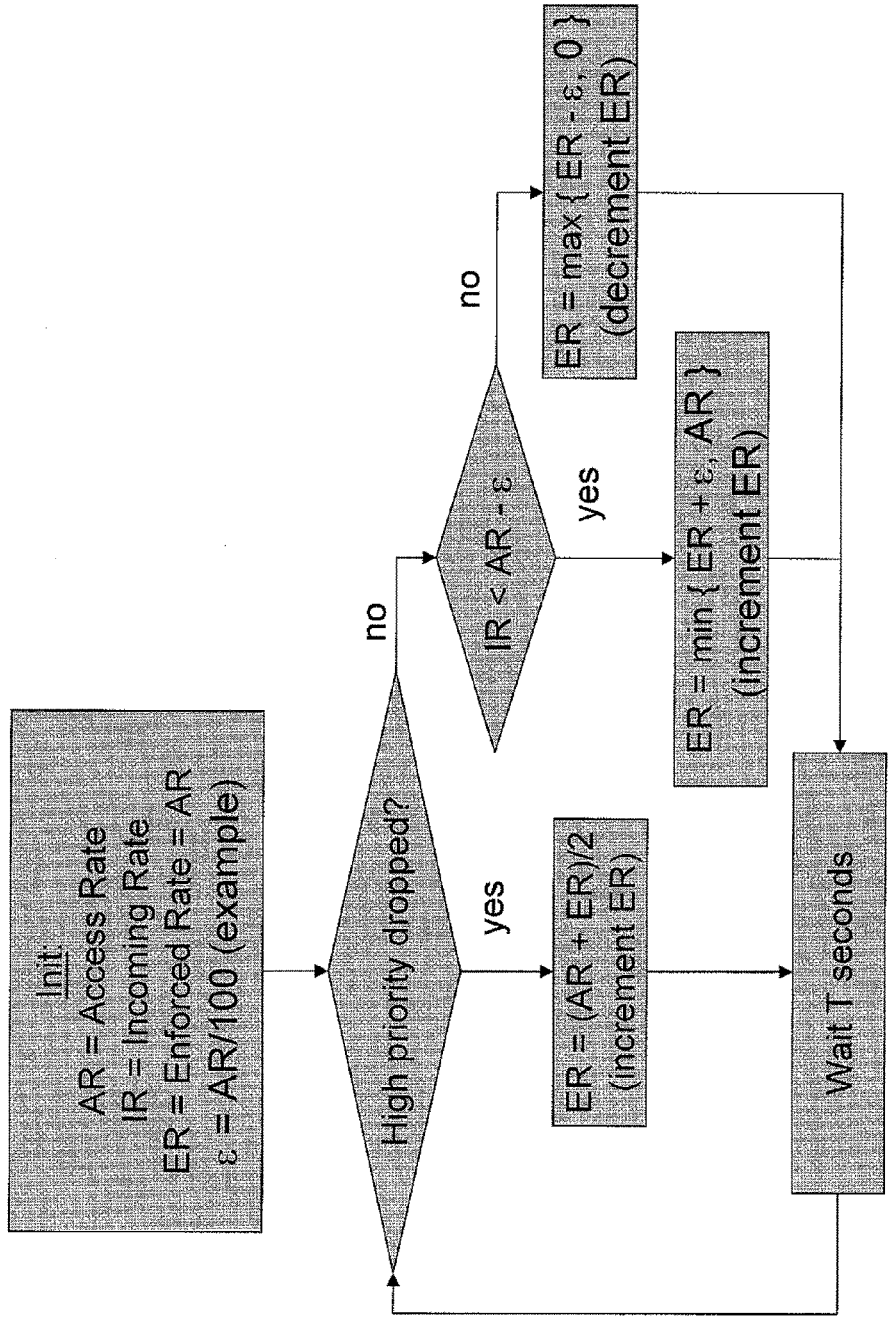
Fig. 6: Enforcement Rate Auto Sensing

BANDWIDTH ALLOCATION METHOD AND APPARATUS

RELATED APPLICATIONS

The present application claims benefit of U.S. Provisional Patent Application No. 61/102,847, filed on Oct. 5, 2008, the contents of which are incorporated herein by reference.

FIELD AND BACKGROUND OF THE INVENTION

The present invention relates to bandwidth allocation method and apparatus and, more particularly, but not exclusively to such allocation in cases of oversubscription, for bottleneck management.

Network service providers typically provide network access to a large number of service subscribers. Each subscriber expects to receive a minimal bandwidth allocation for purposes such as Internet browsing, file downloads and uploads, or interactive communications such as voice or video calls. On the other hand, network service providers intentionally allocate or provision a limited bandwidth resource to serve all subscribers. In many situations, this bandwidth resource is less than the maximal aggregate bandwidth that all subscribers may theoretically consume simultaneously. This conduct is known in the art as oversubscription.

Oversubscription is based on the statistical knowledge that at any given time only a subset of subscribers actually consume network bandwidth to the extent they are entitled to. As a result, when all or most of the subscribers conform to the statistical model, they typically perceive the bandwidth allocated to them as sufficient to serve the bandwidth they are entitled to. However, sometimes, and more often in recent years, a small number of subscribers consume all the bandwidth they are entitled to over extended periods of time. Typically, such peak consumption is due to the use of peer to peer file sharing applications such as BitTorrent or eMule. The extensive consumption of bandwidth by a subset of subscribers violates the statistical model which is the foundation of oversubscription and results in the degradation of service that the service providers can provide to the majority of their subscribers, who still conform to the statistical model of usage. As a result, network service providers require means for limiting the excessive consumption of bandwidth by any given subscriber.

Until recently, the common measures used for limiting overconsumption of bandwidth by subscribers were based on classifying network traffic consumed by subscribers, identifying traffic related to applications known for their heavy bandwidth consumption, such as the abovementioned peer to peer file sharing applications, and limiting the bandwidth that such applications are allowed to consume. In addition, service providers are known to have administratively limited over consumption of bandwidth by terminating or threatening to terminate service contracts with such subscribers.

Following federal rulings in the USA, the practice of traffic classification as the basis for overconsumption control has become illegal. As a result, new means for management are required that are agnostic to the applications consuming the bandwidth. Such means are required to limit overconsumption of bandwidth by ensuring fair use of bandwidth by subscribers. There are various definitions for fair use but all of them attempts to define fair bandwidth usage by subscribers, namely a subscriber entitlement to consume bandwidth in a way and to a limit that does not impair the ability of other subscribers to have fair access to bandwidth.

The typical goal of a fair access policy enforcement mechanism is to ensure that each subscriber has the ability to consume a minimal transmission rate while the remaining bandwidth is fairly divided between all subscribers actively transmitting traffic into the access network, possibly taking into account the maximal rate each subscriber is entitled to. Such a mechanism may drop, forward or mark traffic as associated with a given traffic priority. The act of dropping or marking traffic as a means for managing the bandwidth consumed by a subscriber is known in the art as traffic policing. It is customary in the art to implement traffic policing by using token bucket rate limiters for estimating the actual rate of traffic flowing and enforcing a maximal rate.

As is known in the art, token bucket rate limiters may store tokens representing data to be transmitted, one token per each unit of data. Whenever a unit of data, such as a byte, is transmitted, a token is "cashed in". The shaper has a maximum bucket size (which corresponds to a maximum burst size) and the number of tokens available at a given time corresponds to the current allowed number of data units that may be transmitted. If there are no tokens in the bucket, then no packets may be transmitted and an arriving packet may either be dropped or marked as eligible for dropping. Tokens are replenished based on the time that has passed since the last transmission of the rate limiter and the average rate it is allowed to transmit. Typically, the number of tokens added to the token bucket is the minimum between the maximum bucket size and the multiplication of the time elapsed since last replenishment and the allowed limiter rate in terms of data units per time unit.

An algorithm for a token bucket system may be conceptually understood as follows:

A token is added to the bucket every $1/r$ seconds.

The bucket can hold at the most b tokens. If a token arrives when the bucket is full, it is discarded.

When a packet (network layer PDU) of n bytes arrives, n tokens are removed from the bucket, and the packet is sent to the network.

If fewer than n tokens are available, no tokens are removed from the bucket, and the packet is considered to be non-conforming.

The algorithm allows bursts of up to b bytes, but over the long run the output of conformant packets is limited to the constant rate, r. Non-conforming packets can be treated in various ways:

They may be dropped.

They may be enqueued for subsequent transmission when sufficient tokens have accumulated in the bucket.

They may be transmitted, but marked as being non-conforming, possibly to be dropped subsequently if the network is overloaded.

Token buckets may be incorporated into equipment provided say at the user premises, or for a link as a whole.

It is customary in the art to prioritize different types of traffic, typically associated with different services such as voice, video or Internet access provided by a network service provider. In case of congestion in a network, high priority traffic such as voice is typically allowed to consume bandwidth before lower priority traffic such as Internet traffic may consume it. Thus, in a case of insufficient bandwidth, low priority traffic may be partially or entirely dropped while high priority traffic is forwarded. The above notion is known as traffic prioritization. Even a network that enforces fair use of bandwidth must still take traffic prioritization into account.

As is known in the art, pairs of token buckets may be combined to form what is known as dual token bucket rate limiters (or shapers) in order to mark packets with priority markings. For example, given one token bucket B 1 which rate limits to a rate R1 and another token bucket B2 which rate limits to a rate R2, where R1<R2, a packet may be assigned a high priority if it arrives at B1 when it holds enough tokens to allow its transmission. If B1 does not hold enough tokens to allow transmission but B2 does, the packet may be assigned a low priority. If both B1 and B2 do not hold enough tokens to allow transmission, the packet may be dropped or marked as eligible for dropping. Hence, each packet traversing a dual token bucket may be marked with one of three markings: High, Low or Eligible to Drop. Such a mechanism is also known in the art as a tri-color marker.

Mechanisms for traffic prioritization may make use of tri-color markers to enable forwarding of assured rates while dropping traffic exceeding an assured rate in the case of congestion.

Fair share use may be enforced at various points in service provider networks. Typically, one enforces fair use on traffic before it reaches a congestion point in the network. However, in some cases, it is problematic to position such enforcement mechanisms before congestion points (upstream to congestion points) due to cost or manageability issues. For instance, in access networks where subscribers are connected via a wireless medium to a service provider fixed network, the wireless medium may be a congestion bottleneck, but enforcing fare share at every subscriber premises may be unfeasible due to an inability to communicate with other subscribers in order to detect or calculate the fair share.

Most Internet traffic, including all TCP traffic, performs some form of congestion control. The goal of this congestion control is to maximize utilization of the possibly limited bandwidth resources while reacting to congestion by reducing bandwidth consumption. One way of reducing consumption is for example by reducing the TCP window size to ensure fair access to these resources. Such protocols are known to probe the resources for available bandwidth by increasing their consumption gradually until packet loss is detected. For instance, TCP traffic does this by increasing its window size. When packet loss is detected, such protocols typically reduce bandwidth consumption.

SUMMARY OF THE INVENTION

According to one aspect of the present invention there is provided a system for bandwidth assignment to manage congestion over a network bottleneck, the system comprising a regulation point being set up downstream of the bottleneck in the network to manage congestion in data packets arriving from at least two sources via the bottleneck, the system comprising, for each of the at least two sources, a priority level assigner for assigning priority levels to respective data packets, and at least one token bucket for assigning tokens at a limiting rate to the prioritized data packets, the tokens allowing passage of packets to which they are assigned, the token bucket being a multi-priority token bucket having at least two thresholds corresponding to priority levels assignable to packets, and the token bucket assigning a token to an arriving packet having a respective priority level if there are sufficient tokens currently in the bucket to reach a one of the thresholds corresponding to the respective priority level.

In an embodiment, the at least one priority token buckets are arranged to define a bandwidth, and a bandwidth defined by the token buckets is lower than a maximum rate allowed by a corresponding network locality.

In an embodiment, the thresholds respectively define minimal numbers of tokens required within the token bucket for a packet of a corresponding priority to be eligible for token consumption.

In an embodiment, each threshold corresponds to a single priority level.

In an embodiment, the network comprises a hierarchy of bottlenecks, and the system comprises a hierarchy of multi-priority token buckets for the hierarchy of bottlenecks.

In an embodiment, the hierarchy of token buckets is placed downstream of the hierarchy of bottlenecks.

In an embodiment, the at least one token bucket is configured to supply a quantity of tokens, the quantity being selected to underuse the bottleneck by a margin, the margin being dynamically variable.

In an embodiment, the bottleneck comprises a network access link, including an Internet access link.

In an embodiment, the bottleneck comprises any one of the group consisting of:

a link between an Optical Line Termination (OLT) point and a network service provider network;

a digital subscriber line access multiplexer (DSLAM) link and a network service provider network;

a broadband remote access server (BRAS) link and a network service provider;

a cable modem termination system (CMTS) and a network service provider;

a serving GPRS (general packet radio service) support node (SGSN) and a network service provider;

an LTE (long term evolution) compatible link and a network service provider; and a wireless access link.

According to a second aspect of the present invention there is provided a system for bandwidth assignment to manage congestion over a network bottleneck, the system comprising a regulation point being set up downstream of the bottleneck in the network to manage congestion in data packets arriving from upstream in the network, the apparatus comprising a limiter for allowing packets to pass up to a threshold, the threshold being lower than a maximum rate of the congestion point.

According to a third aspect of the present invention there is provided a token bucket limiter for congestion management over a network bottleneck, the bucket limiter comprising:

an input unit for receiving packets of a given source with assigned priority levels;

a rate limiter for inserting tokens at a given rate;

a thresholder for providing thresholds associated with priority levels, the thresholds defining numbers of tokens to be present before packets below the associated priority are eligible for token assignment; and a token assigner for assigning tokens to arriving packets according to a respective priority level and associated threshold to allow passage of the packets.

According to a third aspect of the present invention there is provided a method of congestion management for a plurality of sources sending data packets over a network bottleneck, the method comprising:

setting an overall bandwidth over the bottleneck, the bandwidth not exceeding a physical maximum bandwidth defined by the bottleneck;

assigning the bandwidth between the sources as per source bandwidth allocations;

assigning priority levels to packets for each source; and for each source assigning highest priority packets in precedence to the per source bandwidth allocation.

In an embodiment, the overall bandwidth set over the bottleneck is less than the maximum physical bandwidth by a variable margin.

An embodiment may involve dynamically varying the margin.

In an embodiment, the dynamically varying the margin comprises probing cycles carried out at predetermined or dynamically adjusted intervals, each cycle comprising increasing the margin if no high priority packets are being dropped and as long it is detected that the incoming traffic rate remains equal to the network capacity but otherwise decreasing the margin from the actual network capacity.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 is a flow diagram showing an exemplary embodiment of an automatic enforcement rate sensing for the probing procedure of FIG. 3.

DESCRIPTION OF THE PREFERRED EMBODIMENTS

Figure 1:
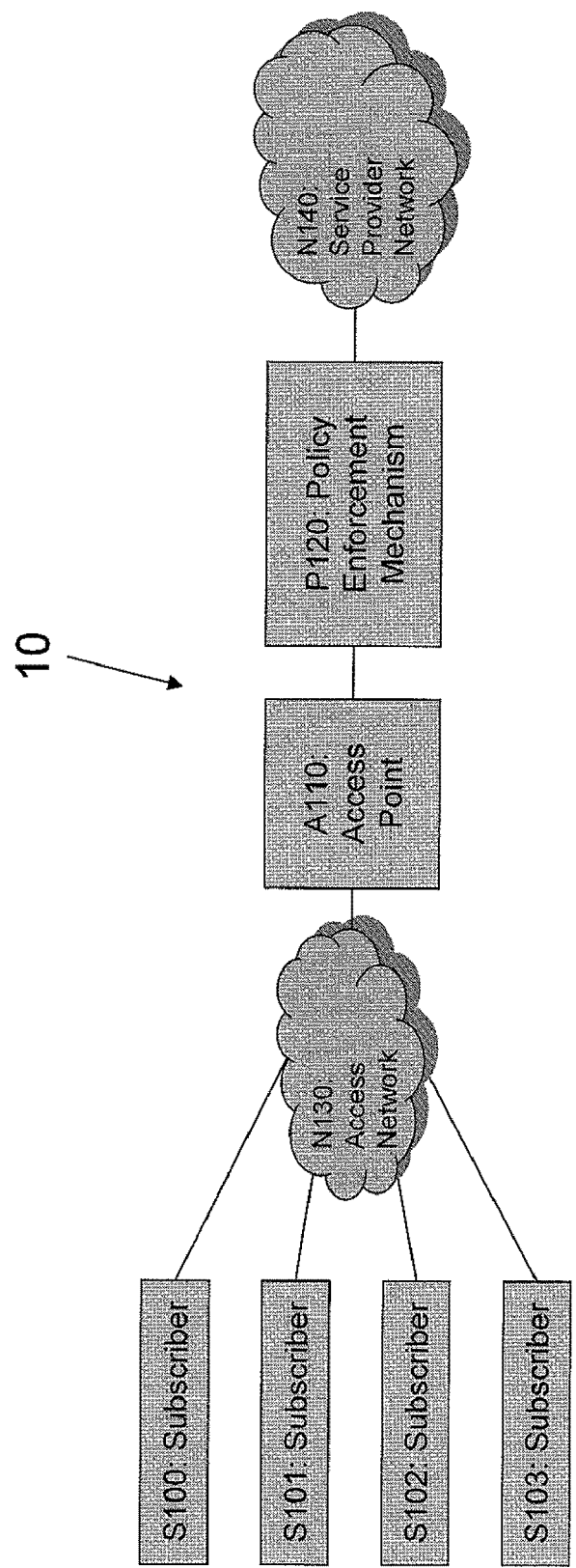
FIG. 1 is a simplified diagram illustrating a network having a bottleneck and an enforcement device according to a first embodiment of the present invention.

The present embodiments comprise a bandwidth management system or traffic shaping system designed particularly but not exclusively to manage bottlenecks at network edges.

The present embodiments describe a method and system for enforcing fair use in service provider networks with or without a requirement for traffic prioritization. In an embodiment an enforcement point is positioned downstream of the network congestion point.

In such networks, fair share enforcement mechanisms may be positioned after the congestion points, that is downstream of the congestion points. For instance, in a wireless access network, it would be desirable to have an enforcement mechanism positioned at or near the wireless access point which is an aggregation point for all subscribers sharing the same wireless medium.

Embodiments may provide a method for limiting traffic rates of a plurality of sources with different priority levels. The method uses token buckets per source or per subscriber, in particular dual token buckets per subscriber, and a plurality of thresholds set for different priority levels such that each threshold defines a minimal level of tokens to be present within the token bucket to allow token consumption by a packet of a given priority.

The method may comprise limiting traffic rates of a plurality of sources, or for that matter, subscribers, with different priority levels by using a hierarchy of token buckets with thresholds.

The method may limit traffic rates of a plurality of sources or subscribers, with different priority levels such that each source or subscriber is guaranteed its fair share of bandwidth.

The method may enforce fair use of bandwidth in a network.

The method may set the maximal rate enforced by a multi-priority token is bucket rate limiter to be below the actual capacity of the congestion point it corresponds to.

The method may be used between a wireless access point and a network service provider network connecting it to the Internet.

The method may be used between an Optical Line Termination (OLT) point and a network service provider network connecting it to the Internet.

The method may be used between a DSLAM or BRAS and a network service provider network connecting it to the Internet.

The method may be used between a CMTS and a network service provider network connecting it to the Internet.

The method may be used between a base station unit or SGSN or LTE and a network service provider network connecting it to the Internet The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to FIG. 1, System 10 provides for bandwidth assignment to manage congestion over a network bottleneck—access network N130 which has to service a range of subscribers S100-S103. The system comprises a regulation point P120 set up downstream of the bottleneck in the network to manage congestion in data packets arriving from the various sources via the bottleneck. The apparatus comprises, for each of the sources or subscribers, a tri-color marker, which is a priority level assigner typically implemented as a dual token bucket (TC301-304 in FIG. 2) for assigning priority levels to the various data packets. The dual token buckets are followed by one or more multi-priority token buckets (MP310 in FIG. 2) for assigning tokens at a limiting rate to the prioritized data packets according to different quota limits such that only packets assigned tokens are permitted to pass. Each multi-priority token bucket is set with thresholds (L201-L204 in FIG. 4) and the thresholds are used in assigning tokens to packets according to their priority. It is noted that packets are handled as they arrive and are not in general stored until tokens become available. Thus, given a packet of an assigned priority requiring a given number of tokens (corresponding to its length), if the multi-priority token bucket holds at least the given number of tokens in addition to a threshold number of tokens for the assigned priority, the packet is forwarded and the number of tokens assigned to it is deducted from the multi-priority token bucket. If the multi-priority token bucket holds less than the required number of tokens in addition to the threshold number of tokens for the assigned priority, the packet is dropped or marked for deletion. Tokens may be added to the token bucket periodically or following the handling of a packet. In both cases, the number of tokens added to the multi-priority token bucket is defined by the time elapsed since the previous token addition multiplied by the rate to be enforced in terms of tokens per timeframe. Since different thresholds may be assigned to different priorities, at a given time, a high priority packet may be assigned tokens while a low priority packet may be dropped due to the different thresholds. Thus any tokens in the bucket are first assigned to an incoming packet of any given priority if there are enough tokens for assignment to that packet in addition to there being enough tokens to reach the threshold for that priority level. If there are not enough tokens then the current packet is marked for deletion. Thus if the threshold for the third priority level is 45, there are currently 50 tokens in the bucket and a packet arrives of the third priority level which requires 5 tokens, then that arriving packet will be passed.

In an embodiment, the rate enforced by a (single) multi-priority token bucket corresponds to a known network bottleneck. However, as discussed in respect of FIG. 3, the enforced rate may be lower than the rate the bottleneck allows. Different multi-priority token buckets may then correspond to different bottlenecks. The bottlenecks may themselves be dependent or independent in the network. The priority assigners, or tri-color markers on the other hand, may enforce rates corresponding to the service type assigned to a source or subscriber. Hence, the aggregate rate they enforce may be higher, lower or equal to the rate enforced by the multi-priority token buckets they precede. In an embodiment, the tri-color markers may mark an aggregate rate of packets as high priority packets, where that aggregate rate is lower than the rate enforced by the multi-priority token bucket they precede, and in addition they may mark an aggregate rate of packets as low priority packets, where this aggregate rate is higher than the rate enforced by the multi-priority token bucket they precede. The thresholds may be set as numbers of tokens, that is to say they define minimal numbers of tokens required within the token bucket for a packet of a corresponding priority to be eligible for token consumption.

In an embodiment, each threshold corresponds to a single priority level, so that number of thresholds equals number of priority levels. The priorities may for example apply to traffic types, whereas the thresholds may correspond to the priorities. More particularly, a subscriber may be entitled to consume traffic of various types and hence there is no 1:1 correspondence between "subscriber" and "traffic type". In particular a single "user" could be entitled to multiple priorities depending on the traffic type. On the other hand, a traffic type is assigned a single priority, and multiple traffic types may be assigned the same priority. Finally, each priority is assigned a threshold and multiple priorities may be assigned the same threshold although typically they would be assigned different thresholds.

Figure 5:
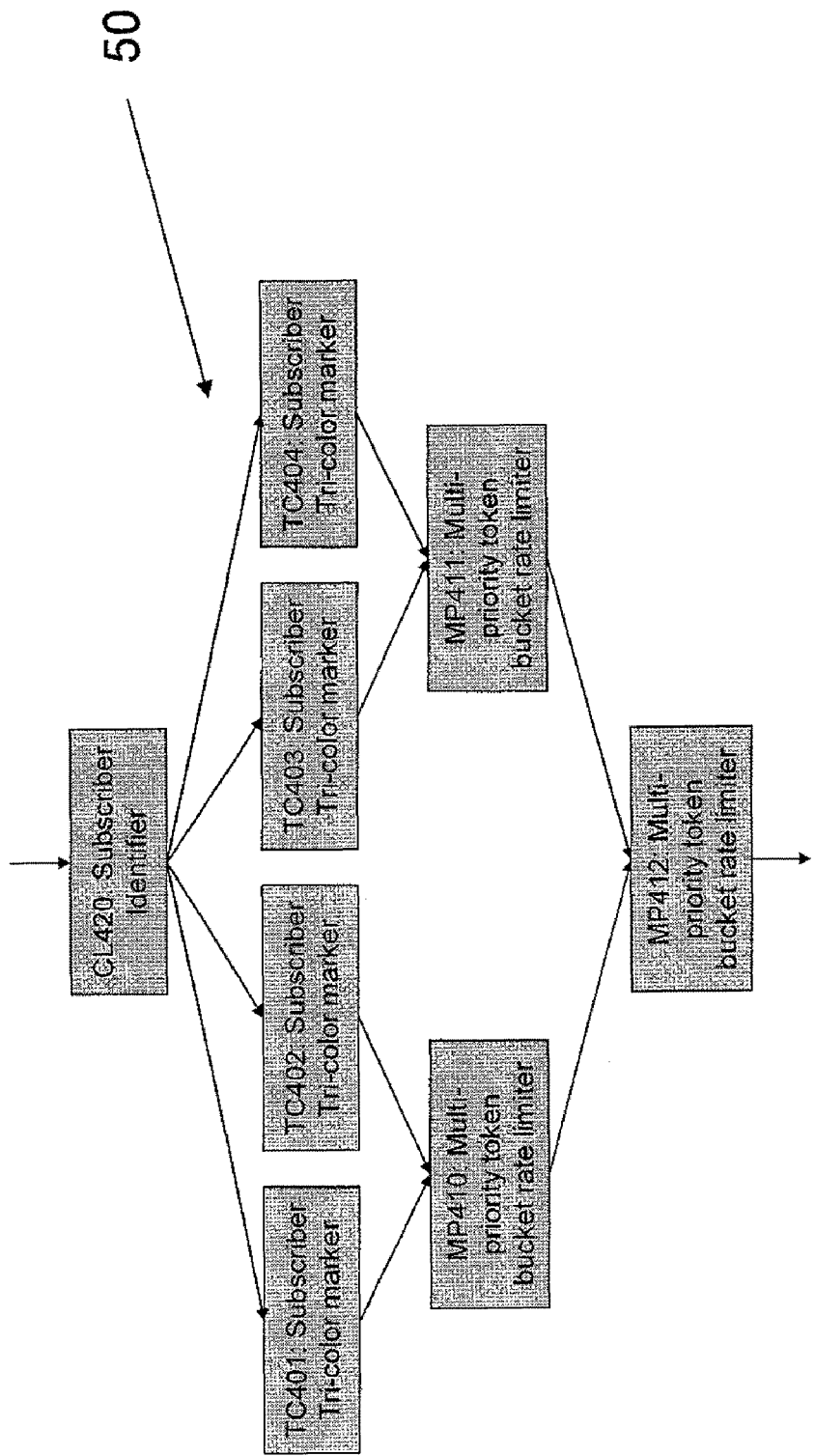
FIG. 5 is a simplified diagram showing an enforcement device according to a second embodiment of the present invention wherein there is more than one bottleneck which is dealt with by a hierarchy of token buckets, according to a second embodiment of the present invention.

As will be discussed in greater detail with respect to FIG. 5 below, a network may comprise more than one bottleneck. In such a case the system may set up a hierarchy of token buckets for the hierarchy of bottlenecks.

The hierarchy of token buckets may be placed downstream of the bottlenecks.

In an embodiment, the token bucket is configured to supply a quantity of tokens, the quantity being selected to underuse the bottleneck by a margin, the margin being dynamically variable. The use of a margin is intended to ensure that the enforced bottleneck is tighter, that is narrower, than the actual network bottleneck such that packet drops are in general performed by the policy enforcement mechanism (See FIG. 1 P120) and not at the point of network congestion. Without a margin, some of the packets may be dropped arbitrarily at the congestion point, hence impairing the ability of the policy enforcement mechanism to determine which packets should be dropped. In fact packets may be dropped at the congestion point but under the condition that all packets are of the highest priority level and no lower priority packets are able to pass the bottleneck.

Figure 3:
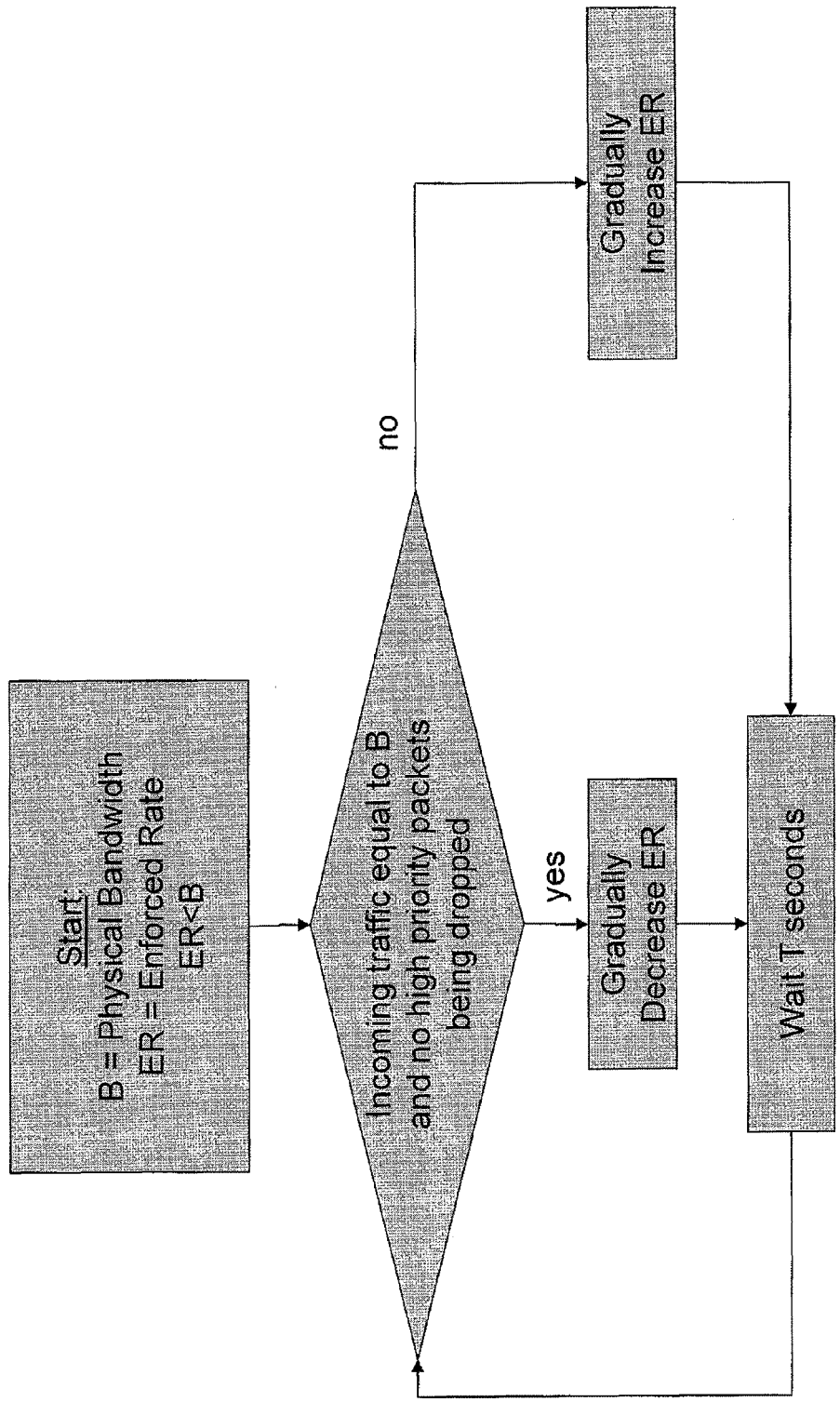
FIG. 3 is a simplified flow chart showing a probing procedure for setting a margin, according to an embodiment of the present invention.

The margin may be determined in a process of probing as per FIG. 3. In probing as per FIG. 3, a probe may be configured to vary a quantity per unit time of tokens gradually to set the bottleneck value. The value may then be enforced by token buckets although not necessarily defined in terms of tokens, such that it is as close as possible to the true network capacity and slightly below it to ensure that packet drops are performed by the policy enforcement mechanism and not at the network congestion point. To achieve this, the margin from the actual network capacity is decreased—that is the rate is slowly increased—as long as the policy enforcer detects that the incoming traffic rate remains strictly below the network capacity. If this is not the case, and as long as no high priority packets need to be dropped (indicating that the network congestion does not even allow for high priority service), the margin is increased (a measure which normally results in a reduction of the incoming rate). The system is then able to set a new margin, with a reasonable idea of what kind of packets are being dropped. This process may be repeated once in a fixed or variable timeframe in order to determine a more appropriate margin dynamically based on the current traffic patterns.

Bottlenecks are typically at subscriber access ends of a network and may include any of the following, a network access link, including an Internet access link. They may be of any of the following types:

a link between an Optical Line Termination (OLT) point and a network service provider network;

a digital subscriber line access multiplexer (DSLAM) link and a network service provider network;

a broadband remote access server (BRAS) link and a network service provider;

a cable modem termination system (CMTS) and a network service provider;

a serving GPRS (general packet radio service) support node (SGSN) and a network service provider;

an LTE (long term evolution) compatible link and a network service provider; and a wireless access link. An example of a wireless access link is the Motorola Canopy Access™ network.

Returning to FIG. 1, as mentioned, a plurality of subscribers S100, S101, S102 and S103 are connected to the provider arrangement 10 via an access network N130 to an access point A110. Each subscriber may be assigned a maximal rate of transmission to and from the access network as well as a guaranteed transmission rate. Typically, the sum of maximal allowed transmission rates is higher than the capacity of the access network while the sum of guaranteed transmission rates is below the capacity of the access network. Hence, the access network is a potential congestion point in the network. The access network may be any type of access network, including a fiber optic, copper or wireless network such as a DOCSIS, PON (including BPON and GPON), POTS, Wifi, Wimax, 2G, 2.5G or 3G network.

In order to enforce fair use of the access network, a policy enforcement mechanism P120 is used to perform such enforcement according to a service provider sharing policy and based on the transmission rates assigned to the subscribers. Traffic that adheres to these parameters is forwarded by the policy enforcement mechanism towards the core of the service provider network N140 which is typically connected to the Internet. In an alternative embodiment, the policy enforcement mechanism P120 may be an integral part of the access point A110.

In many cases, the congestion over the access network is due to traffic transmitted by the subscribers towards the access point. Nevertheless, it is typically impractical to position policy enforcement mechanisms near the subscribers. Thus, according to the present embodiments the policy enforcement mechanism may be located downstream of the potential congestion point N130. Such a downstream location means that the actual real time effect of the congestion point can be measured and responded to. The following describes a mechanism according to the present embodiments which may enforce a congestion management policy downstream from the access network, where the policy enforcement mechanism P120 is positioned. It is noted that in FIG. 1 the policy enforcement mechanism is shown as being separate from the access point but, as mentioned in the previous paragraph, the enforcement mechanism may conveniently be incorporated within the access point A110.

A Hierarchical Fair Share Traffic Policer

The policy enforcement mechanism may provide a hierarchical traffic policing method and system that may make use of tri-color markers and multi-priority token bucket rate limiters to enforce maximal subscriber rate limits while ensuring minimal fair share rates as well as traffic priority enforcement.

Figure 2:
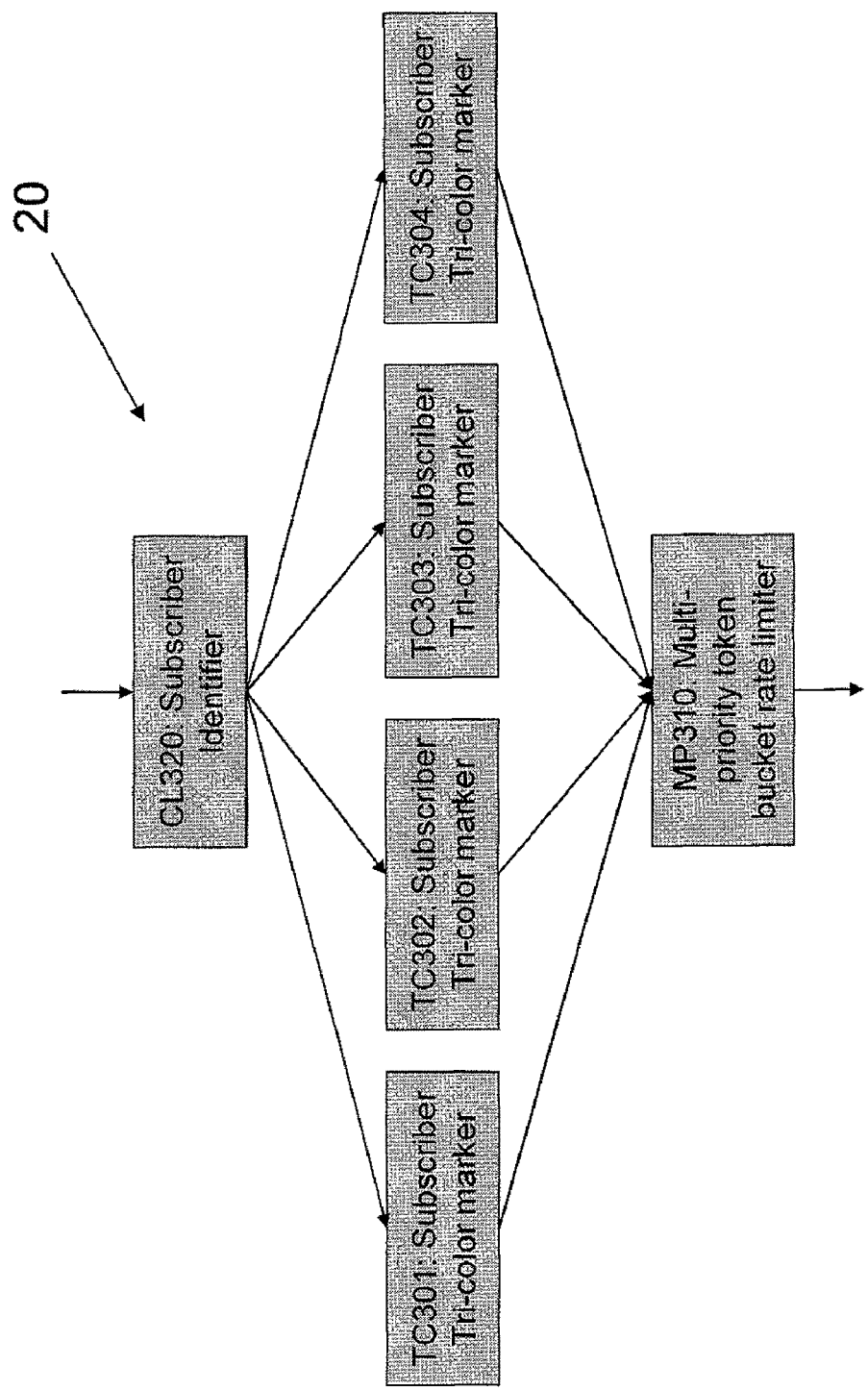
FIG. 2 is a simplified block diagram showing in greater detail the enforcement device of FIG. 1.

Reference is now made to FIG. 2, which is a simplified diagram illustrating a hierarchical multi-priority traffic policer 20 according to a preferred embodiment of the present invention. The policer 20 is comprised of a subscriber identifier mechanism CL320 which classifies arriving traffic as belonging to a given subscriber. Accordingly, traffic is forwarded to one of a multiplicity of subscriber level tri-color markers, each being a dual rate token bucket rate limiter. The markers are marked TC301, TC302, TC303 and TC304 and each is connected to a single multi-priority token bucket rate limiter MP310. Each tri-color marker marks packets with priority marks, based on specific subscriber level subscription parameters, or may mark them as packets to be dropped. The multi-priority token bucket rate limiter forwards traffic such that the aggregate bandwidth consumed by the packets it forwards does not exceed a given limit, exactly as a single token bucket rate limiter would. However it additionally ensures that high priority traffic is given precedence over low priority traffic.

The thresholds are provided per priority. It is noted that not all users may obtain the same priority levels, since some may have paid for and be receiving higher grade services In the specific case where all subscribers are assigned the same high and low priority markings according to their bandwidth consumption, where high priority marks are assigned to packets arriving within a low assured rate and low priority marks are assigned to packets arriving above such a low rate and up to a maximal rate per priority, the above described hierarchical multi-priority policer ensures that every subscriber is ensured minimal bandwidth within the network and only if such minimal bandwidth can be assured, will subscribers be able to consume more than their minimal assured traffic rate. Hence, the hierarchical multi-priority traffic policer is a useful mechanism for enforcing fair use of an oversubscribed network such as the access network in FIG. 1 above.

It was noted by the inventors that as long as the hierarchical multi-priority traffic policer enforces a lower aggregate bandwidth limit than the access network preceding it, and if traffic flowing through it is traffic with flow control or congestion control mechanisms that respond to congestion indications such as packet loss as is expected by TCP/IP traffic, it is effective in enforcing fair share bandwidth consumption even though it is positioned downstream from a congested access network. The aggregate bandwidth limit is the rate enforced by the multi-priority token bucket rate limiter. By setting its maximal allowed rate to be slightly below that of the capacity of the access network, the policer ensures that all high priority packets eventually arrive at the policy enforcement mechanism. This ensures that it is the policer that enforces correct traffic prioritization, eliminating the natural dropping by the network of high priority traffic together with low priority traffic in a non-discriminating way. Rather the policer receives all the high priority traffic and is able to change the limits for future traffic dynamically.

It is also noted that if such a rate limit were to be set to be above the capacity limits of the access network, the effect is no longer possible and fair access can no longer be ensured. Hence, by sacrificing a small percentage of bandwidth, typically in the range of 5%-10% of bandwidth of the access network, it is possible to enforce fair share use downstream of the access network. Moreover, it is possible to automatically sense the extent of bandwidth sacrifice required to enforce fair use.

Reference is now made to FIG. 3, which is a simplified flow diagram illustrating a mechanism for sensing, determining and ultimately enforcing an optimal bandwidth sacrifice level. In probing as per FIG. 3, a probe may be configured to vary a rate of tokens gradually to set the enforced bottleneck value to an optimum. If the incoming traffic is equal to the physical bandwidth and high priority packets are currently being retained then the enforced rate is gradually reduced. If the above two conditions do not yield true then the enforcement rate is gradually decreased. A time delay intervenes and then the test is repeated.

The enforced rate is thus kept as close as possible to the true network capacity but slightly below it to ensure that packet drops are performed by the policy enforcement mechanism and not at the network congestion point, so that the system can monitor what packets are being dropped.

To achieve this, the margin over the actual network capacity is decreased—that is the rate is slowly increased—as long as the policy enforcer detects that the incoming traffic rate remains strictly below the network capacity. If this is not the case, until incoming traffic rate is strictly below the network capacity and as long as no high priority packets need to be dropped (indicating that the network congestion does not even allow for high priority service), the margin is increased (a measure which normally results in a reduction of the incoming rate). In practice, high priority packet drops within a given period may be indicated by a summation register or by setting a Boolean flag. The system is then able to set a new margin, with a reasonable idea of what kind of packets are being dropped.

The above process of a continuous increase and decrease defines an iteration of probing of the link. By iterating such probing once, or on a periodic or on a continuous basis, an estimate may be obtained of the optimal limit to be enforced. The network operator may define high and low limits of the bottleneck to be enforced which defines a level of aggressiveness (degree of over enforcement) of the congestion control of the actual traffic flow. Thus traffic control is provided through a method of over enforcement.

In fact, in the case where all arriving packets have the same level of priority, particularly if they are all of high priority, the above strategy is not helpful. In such circumstances a good strategy is to set the margin to zero and simply allow as many packets as possible.

Figure 4:
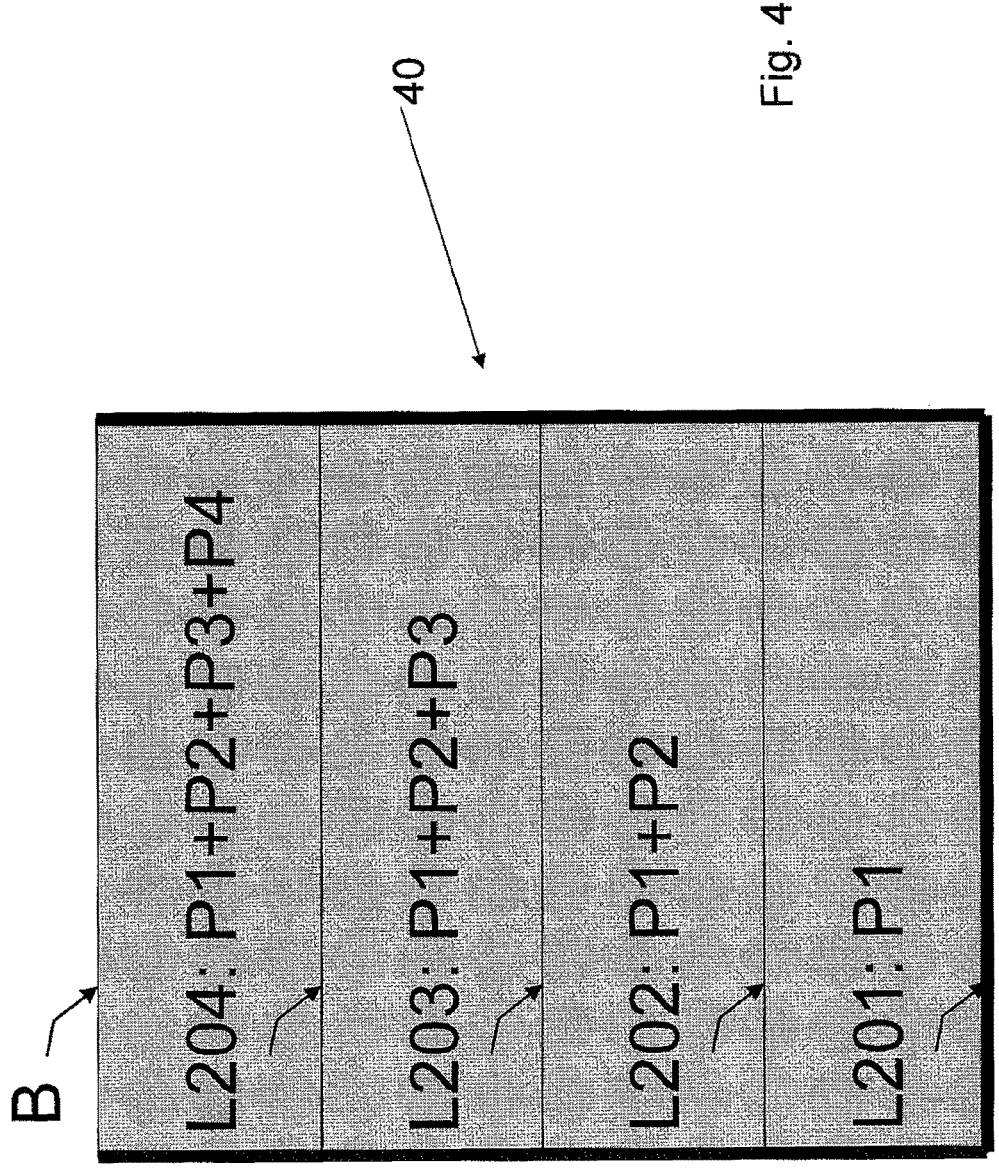
FIG. 4 is a simplified diagram showing a token bucket set with priority levels.

Reference is now made to FIG. 4, which is a simplified diagram illustrating a multi-priority token bucket rate limiter according to an embodiment of the present invention. In the bucket rate limiter of FIG. 4, a multi-priority token bucket is comprised of a single token bucket 40 and a set of thresholds L201, L202, L203 and L204. Four thresholds are shown for convenience but the exact number may be selected by the skilled person based on the particular system being managed. Each threshold is associated with a minimal priority. Each threshold defines the minimal number of tokens that must be present within the token bucket for a packet of a priority above its minimal priority to be eligible for token consumption. Otherwise, the multi-priority token bucket is similar to the token bucket rate limiter known in the art to the extent that tokens are added to the bucket based on the time elapsed multiplied by the allowed maximal rate. If a packet is eligible for transmission as defined by its priority and the definition of the abovementioned thresholds, it may consume tokens based on the size of the packet in data units. If a packet is not eligible for token consumption it is either dropped or marked as eligible for dropping.

For example, let P1>P2>P3>P4, meaning that P1 is a higher priority than all other priorities. Let L201 be s associated with a minimal priority P1, L202 with a minimal priority P2, L203 with a minimal priority P3 and L204 with a minimal priority P4. In addition, let L201<L202<L203<L204<B, where B is the size of the token bucket. The relationship between the thresholds means that the fewer the tokens present in the bucket the higher the priority the packet needs to be in order to consume the tokens.

Finally, let R be the rate at which the token bucket is replenished with tokens. Given the above configuration, the multi-priority token bucket ensures that the aggregate rate of forwarded traffic does not exceed the maximal rate R ever. If there are less than L201 tokens in the bucket only packets with priority P1 will be forwarded, in bursts of up to L201 data units. If there are less than L202 tokens in the bucket only packets with priority P1 or P2 will be forwarded, typically in bursts of up to L202 data units, etc. In addition, for example, if arriving packets all belong to a single priority, say P3, the multi-priority token bucket may function as a regular token bucket with rate R and bucket size B-L203.

It should be noted that the number of priorities and number of thresholds do not necessarily need to be the same, and any number of limits or priorities may be defined The above model of a hierarchical multi-priority traffic policer may be further generalized into a hierarchy of multi-priority token bucket rate limiters, where each such rate limiter represents a different congestion point in a hierarchical access network as typically found in common access networks. An example of such a generalized hierarchical multi-priority policer is depicted as policer 50 in FIG. 5, to which reference is now made. As in the hierarchical policer of FIG. 2, there is a single subscriber identifier CL420 which classifies incoming traffic and associates it with subscribers. The traffic of each subscriber is marked by a dedicated tri-color marker TC401, TC402, TC403 and TC404. In the depicted example, the access network may have multiple congestion points. For instance, each pair of subscribers may share a common bandwidth resource such as a common wireless access point. Then the wireless access points themselves may be connected to a single wired access point which is limited in bandwidth as well. Hence, by setting the maximal allowed rates of the multi-priority token buckets MP410, MP411 and MP412 to correspond to slightly less than the capacity at each of the congestion points in the access network, the generalized hierarchical multi-priority policer may enforce fair share use of a hierarchically congested access network. In this example, MP410 and MP411 would correspond to wireless congestion points while MP412 would correspond to the single wired access point.

In the above description the traffic is associated with subscribers. A further embodiment of the above invention relates to the policing of independent traffic so sessions, possibly with multiple sessions associated to a single subscriber. A session may be identified by a variety of notions such as TCP/UDP five-tuple, source address, source VLAN, MAC address or many other possible notions. The thresholds may then be applied to the individual sessions rather than the subscribers they are associated with.

Reference is now made to FIG. 6, which shows the process outlined in FIG. 3 in greater detail. Packets pass the multiple priority token bucket which is presently enforcing a token rate of ER. The system checks if high priority packets are being dropped. If such packets are being dropped then the enforcement rate is incremented and the system waits for a delay of T seconds to test again.

If no high priority packets are being dropped then the system tests the difference between the incoming rate and the access rate. If the difference is less than a preset constant epsilon then the enforcement rate is decremented, otherwise the enforcement rate is incremented. The system waits for the same preset T seconds and tests again.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for bandwidth assignment to manage congestion over a network bottleneck, the system comprising a regulation point being set up downstream of said bottleneck in said network to manage congestion in data packets arriving from at least two sources via said bottleneck, the system comprising, for each of said at least two sources, a priority level assigner for assigning priority levels to respective data packets, and at least one token bucket for assigning tokens at a limiting rate to said prioritized data packets, said tokens allowing passage of packets to which they are assigned, said token bucket being a multi-priority token bucket having at least two thresholds corresponding to priority levels assignable to packets, and said token bucket assigning a token to an arriving packet having a respective priority level if there are sufficient tokens currently in said bucket to reach a one of said thresholds corresponding to said respective priority level, wherein said at least one token bucket is arranged to define an overall bandwidth, said overall bandwidth being lower by a finite margin than a maximum bottleneck bandwidth, wherein said at least one token bucket is configured to supply a quantity of tokens, the quantity being selected to define said overall bandwidth.

2. The system of claim 1, wherein said thresholds respectively define minimal numbers of tokens required within the token bucket for a packet of a corresponding priority to be eligible for token consumption.

3. The system of claim 1, wherein each threshold corresponds to a single priority level.

4. The system of claim 1, the network comprising a hierarchy of bottlenecks, the system comprising a hierarchy of multi-priority token buckets for said hierarchy of bottlenecks.

5. The system of claim 4, wherein the hierarchy of token buckets is placed downstream of said hierarchy of bottlenecks.

6. The system of claim 1, wherein said margin is dynamically variable.

7. The system of claim 1, wherein said bottleneck comprises a network access link, including an Internet access link.

8. The system of claim 1, wherein said bottleneck comprises any one of the group consisting of:
   a link between an Optical Line Termination (OLT) point and a network service provider network;
   a digital subscriber line access multiplexer (DSLAM) link and a network service provider network;
   a broadband remote access server (BRAS) link and a network service provider;
   a cable modem termination system (CMTS) and a network service provider;
   a serving GPRS (general packet radio service) support node (SGSN) and a network service provider;
   an LTE (long term evolution) compatible link and a network service provider; and
   a wireless access link.

9. A token bucket limiter for congestion management over a network bottleneck, the token bucket limiter comprising a bucket for storing tokens for assignment to data packets, the bucket limiter comprising:
   an input unit for receiving packets of a given source with assigned priority levels;
   a rate limiter for inserting tokens into said bucket at a given rate;
   a thresholder for providing thresholds associated with priority levels, said thresholds defining numbers of tokens to be present before packets below said associated priority are eligible for token assignment, an overall number of said tokens defining a limiter bandwidth; and
   a token assigner for assigning tokens to arriving packets according to a respective priority level and associated threshold to allow passage of said packets; and
   wherein the token bucket limiter is located downstream of a congestion bottleneck having a bottleneck bandwidth, and wherein the limiter bandwidth is selected to be lower than said bottleneck bandwidth by a finite margin.

10. A method of congestion management for a plurality of sources sending data packets over a network bottleneck, the method comprising:
   setting an overall bandwidth over said bottleneck, said overall bandwidth being less by a finite margin than a maximum bandwidth physically allowed by said bottleneck;
   assigning said bandwidth between said sources as per source bandwidth allocations by:
      assigning priority levels to packets for each source; and
      for each source assigning highest priority packets in precedence per source;
   setting said finite margin in said overall bandwidth over said bottleneck to be a variable margin; and
   regulating said overall bandwidth assignment and variable margin from a point downstream of said bottleneck.

11. The method of claim 10, further comprising dynamically varying said margin.

12. The method of claim 11 wherein said dynamically varying said margin comprises probing cycles carried out at predetermined or dynamically adjusted intervals, each cycle comprising increasing the margin if no high priority packets are being dropped and as long it is detected that the incoming traffic rate remains equal to the network capacity but otherwise decreasing the margin from the actual network capacity.

* * * * *